April 30, 1968    R. BUCHER    3,380,689
STABILIZING SYSTEM FOR AIRCRAFT
Filed April 12, 1966    2 Sheets-Sheet 2

United States Patent Office 3,380,689
Patented Apr. 30, 1968

3,380,689
STABILIZING SYSTEM FOR AIRCRAFT
Rudolf Bucher, Goethestrasse 16, Zurich, Switzerland
Filed Apr. 12, 1966, Ser. No. 542,103
Claims priority, application Switzerland, Apr. 13, 1965,
5,148/65; Oct. 11, 1965, 13,976/65
4 Claims. (Cl. 244—39)

ABSTRACT OF THE DISCLOSURE

A stabilizing device for air rescue service aircraft wherein two stabilizing elements are mounted upon the wings of the aircraft. Each of the stabilizing elements may rotate about its longitudinal axis and they are mounted on the wings of the aircraft so that in normal horizontal position of the aircraft the longitudinal axis of each stabilizer extends forwardly and upwardly relative to the axis relative to the main axis of the aircraft and during flight the stabilizing elements may revolve by aerodynamic resistance so that the aircraft remains stabilized during a slow approximately vertical parachute-like descent. Each stabilizing element is provided with either a folding hinged flap or may be divided in a diagonal plane. The folding hinged flap provides a trough-shaped cavity.

This invention relates to an improved stabilizing system for an aircraft and in particular to a stabilizing system having reduced drag during normal flight of the aircraft.

In Swiss patent specification No. 378,168 there is described an anti-crash stabilizing system for an aircraft, particularly for an aircraft used for air rescue services. The system described in Swiss specification No. 378,168 consists of two stabilizing elements each provided with trough-shaped air vanes and adapted to rotate about their respective longitudinal axes, each stabilizing element being mounted above one of the aircraft wings and so located in its working position that its longitudinal axis extends obliquely upwards and forwards in relation to the longitudinal plane of symmetry of the aircraft.

It has been found that the trough-shaped vanes of these known stabilizing elements have the drawback of generating excessive drag and of thereby unduly reducing the flying speed of the aircraft. This drawback is overcome by the present invention.

The proposed improved stabilizing system according to the present invention is characterized in that the opening to each trough-shaped air vane of the stabilizing elements can be closed.

The means for closing and opening the trough-shaped stabilizing elements may consist of shutters in the form of folding hinged flaps slidably movable in lateral guide means and thus adapted, when required, to be extended across the openings in the vanes, which may be open at take-off, in such a manner that the stabilizing elements are transformed in normal flight into ordinary airfoil sections which can be turned into a position offering minimum drag to generate additional lift augmenting that of the conventional wings. Each stabilizing element may be divided into several parts along a parting plane through its longitudinal axis, said several parts being relatively displaceable perpendicularly to the longitudinal axis of the stabilizing element. Said parting plane may be a diagonal plane dividing the stabilizing element into two congruent halves.

This arrangement permits the normal speed of the aircraft to be considerably increased by transforming the two stabilizing elements into airfoil sections as described and by fixing them in a stable position of minimum drag.

Figure 1:
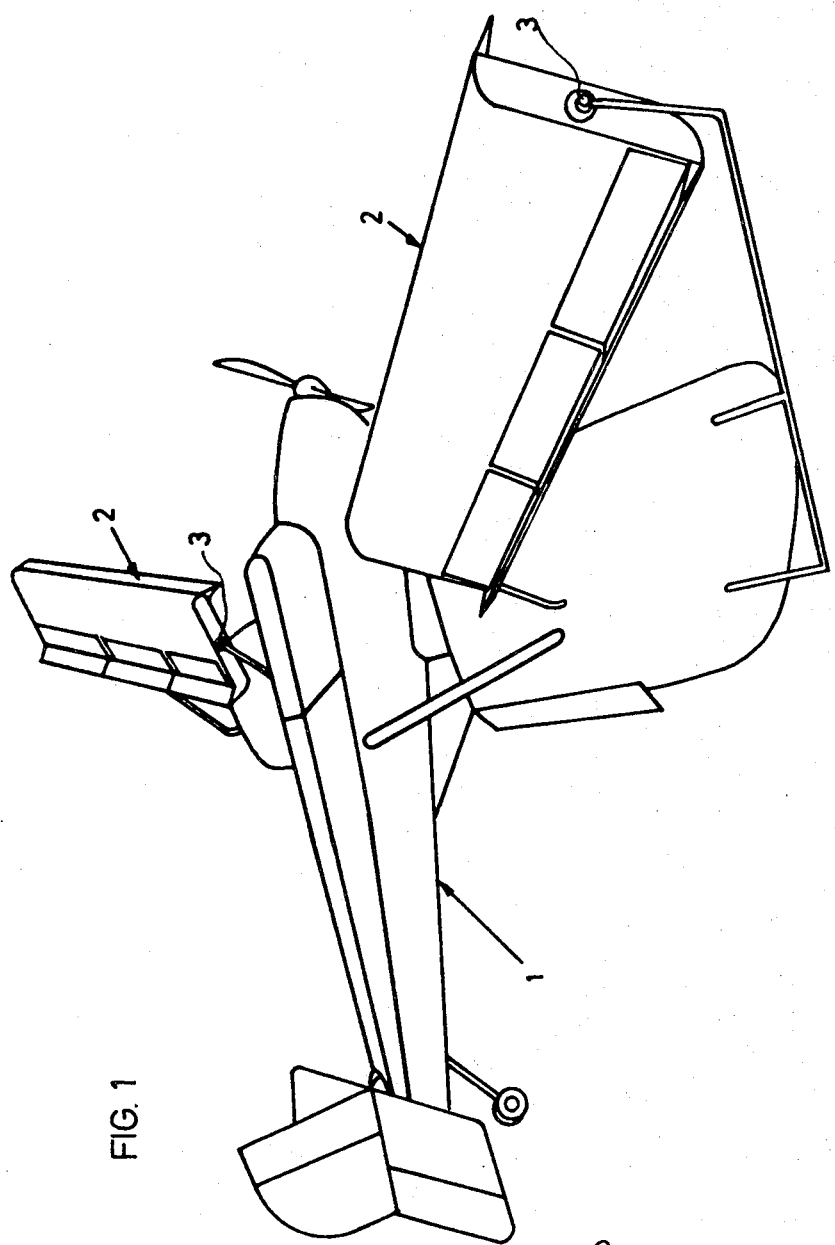
Figure 2:
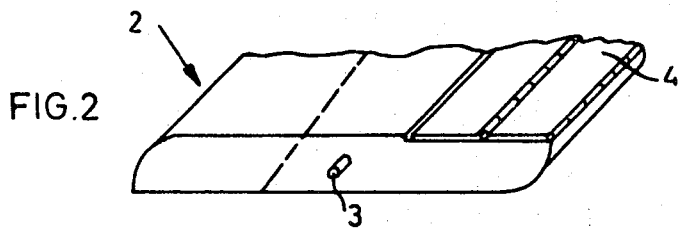
Figure 3:
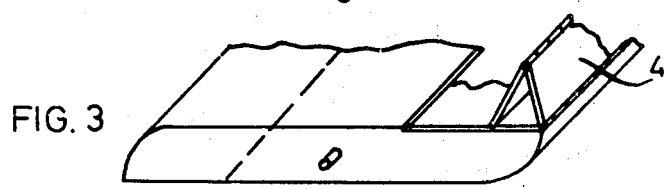
Figure 4:
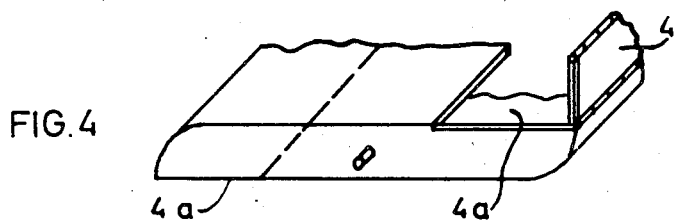
Figure 5:
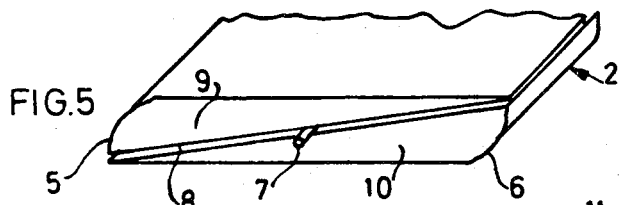
Figure 6:
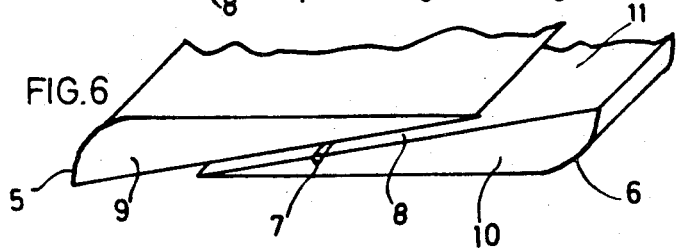

Two embodiments of the invention will be described by way of example, with reference to the accompanying drawings, in which:

FIGURE 1 is a perspective view of an aircraft for air rescue work equipped with one embodiment of stabilizing elements in accordance with the invention, FIGURE 2 is a fragmentary view of part of one of the stabilizing elements illustrated in FIGURE 1 shown in the closed position, FIGURE 3 is a view corresponding to FIGURE 2, showing the opening in the element partially open, FIGURE 4 is a view corresponding to FIGURE 2 showing the element fully open, FIGURE 5 is another embodiment of stabilizing element shown in the closed position, and FIGURE 6 shows the stabilizing element according to FIGURE 5 shown partly open.

FIGURE 1 is a general perspective view of an air rescue service aeroplane generally indicated by the reference numeral 1, equipped with two stabilizers 2 for maintaining a stable attitude of the aircraft under all flying conditions. Each stabilizer 2 is rotatable about an axle 3 attached to one aircraft wing and consists of a hollow body supported by stays from the aircraft wing in such a way that the longitudinal axle 3 of each stabilizer extends forwards and upwards in relation to the main aircraft axis.

During slow flight, or during approximately vertical descent of the air rescue service aeroplane, the surfaces on opposite sides of the hollow body are partly open. The resultant differential aerodynamic resistance will therefore cause the stabilizers to revolve. The total drag experienced by the aircraft is therefore substantially increased in a manner which reduces its rate of descent.

If the stabilizer openings remained open during normal forward flight the stabilizers would continue to rotate and would unenecessarily reduce the flying speed of the aircraft. The stabilizer openings are therefore fitted with folding hinged shutters or flaps 4 (see FIGURES 2 to 4) which can be operated in flight by any conventional means (such as a cable transmission) to close the openings in the stabilizers. As shown in FIGURE 2 the stabilizer 2 resembles a normal airfoil section when the flaps 4 have been closed, and in this condition it generates minimum drag.

In order to prevent stalling of the aircraft and to permit a safe descent in a stable attitude, the shutters or flaps 4 are pulled open into the position shown in FIGURE 4. A trough-shaped cavity 4a is thus uncovered on diametrically opposite sides of each stabilizer 2, which coacts with the resistance of the air to cause the stabilizers to rotate. The mechanism required for operating the shutters or flaps 4 may be of conventional kind but since it is irrelevant to an understanding of the invention it is not specially shown in the drawings.

Another embodiment of the invention is schematically illustrated in FIGURES 5 and 6.

The stabilizer generally indicated by reference numeral 2 has the overall shape of a shallow elongated box, the narrow opposite longitudinal edges 5 and 6 being rounded to provide a better aerodynamic profile. The entire stabilizer is rotatable about its axis 7.

The stabilizer 2 is divided along a parting plane 8 into two congruent halves 9 and 10. In the illustrated embodiment, this parting plane extends diagonally through the stabilizer from one longitudinal edge to the other and contains the axis 7 about which the stabilizer rotates. The two parts 9 and 10 are adapted to be relatively slidably movable in such a way that the two rounded edges 5 and 6 are equally dsplaced in opposite directions away from the stabilizer axis 7. Since the confronting faces of the two parts 9 and 10 of the box-shaped stabilizer are open, the relative displacement described above causes a trough-shaped cavity 11 to be uncovered on each side of the stabilizer (see FIGURE 6).

It will be understood that the position of the parting plane 8 need not be as shown in the drawings. For instance, this plane might be approximately parallel to the outer faces of the box-shaped stabilizer, but the parting plane should pass through the rotating axis of the stabilizer.

The two parts 9 and 10 may be adapted to be relatively displaced by sliding in guide means (not shown in the drawing) at the ends of the stabilizer. The two parts 9 and 10 would be guided to move in two substantially parallel planes in opposite directions away from the axis of rotation 7. For improving stability, each stabilizer 2 might also be divided in the longitudinal direction and thus composed of a plurality of elements, guide means being provided where each pair of elements abuts.

Operation, i.e. relative displacement of the two parts 9 and 10, may be effected by any conventional means. A "lazy tongs" mechanism is particularly useful, though hydraulic operation can also be employed.

The embodiments shown in the accompanying drawings are merely intended to assist in clarifying the principle that underlies the invention. They are not intended to limit its scope.

What is claimed is:

1. A stabilizing device for an aircraft, particularly for an aircraft intended for air rescue service, comprising two stabilizing elements, each of said elements being mounted to rotate about its respective longitudinal axis, each of said stabilizing elements being mounted above the corresponding wing of the aircraft, each stabilizer with its longitudinal axis extending forwardly and upwardly in relation to the main aircraft axis so that during flight said stabilizing elements may revolve by aerodynamic resistance whereby the aircraft remains stabilized during a slow, approximately vertical, parachute-like descent.

2. A stabilizing device according to claim 1, wherein each stabilizing element is provided with a folding hinged flap.

3. A stabilizing device according to claim 1, wherein each stabilizing element is divided into two parts at a parting plane extending through the rotating axis of the stabilizing element whereby said two parts may be relatively displaced perpendicularly to the longitudinal stabilizer axis.

4. A stabilizing device according to claim 3, wherein each stabilizing element is a substantially shallow elongated box and said parting plane is a diagonal plane dividing each stabilizing element into two congruent halves.

References Cited

UNITED STATES PATENTS 2,644,653  7/1953  Cowgill _____ 244—8

FOREIGN PATENTS 636,843  1/1928  France.
271,164  5/1927  Great Britain.
483,043  4/1938  Great Britain.
568,145  3/1945  Great Britain.

MILTON BUCHLER, *Primary Examiner.*

T. MAJOR, *Assistant Examiner.*